(12) United States Patent
Sato (10) Patent No.: US 6,270,152 B1
(45) Date of Patent: Aug. 7, 2001

(54) VEHICLE BODY STRUCTURE

(75) Inventor: Manabu Sato, Kanagawa-ken (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/654,879

(22) Filed: Sep. 5, 2000

(30) Foreign Application Priority Data

Sep. 8, 1999 (JP) .................................................. 11-254748

(51) Int. Cl.[7] .................................................. B62D 25/08
(52) U.S. Cl. ...................................... 296/203.02; 296/194
(58) Field of Search ................................... 296/192, 194, 296/203.01, 203.02, 204, 189, 29, 30, 70, 72; 180/90

(56) References Cited

U.S. PATENT DOCUMENTS

| 5,125,715 | * | 6/1992 | Kijima | 296/189 |
| 5,127,704 | * | 7/1992 | Komatsu | 296/204 |
| 5,713,625 | * | 2/1998 | Takahashi et al. | 296/194 |
| 5,988,734 | * | 11/1999 | Longo et al. | 296/203.01 |
| 6,095,592 | * | 8/2000 | Nakatani | 296/188 |

FOREIGN PATENT DOCUMENTS

| 61-275024 | * | 12/1986 | (JP) | 296/203.02 |
| 3-10975 | * | 1/1991 | (JP) | 296/203.02 |
| 2852653 | | 11/1998 | (JP) . | |

* cited by examiner

Primary Examiner—Joseph D. Pape
Assistant Examiner—Patricia Engle
(74) Attorney, Agent, or Firm—McDermott, Will & Emery

(57) ABSTRACT

A vehicle body structure is provided to both enhance the accuracy in positioning suspension mount bolts 7, 8 and improve the workability in assembling a dash panel 1 to a reinforcement member 4. At the stage of casting the reinforcement member 4, the suspension mount bolts 7, 8 as "insert" elements are fixed to the member 4. Owing to the insert structure of the bolts 7, 8, a distance between the bolts 7, 8 is automatically determined to make it unnecessary to ensure the accuracy of the distance between the bolts 7, 8. The reinforcement member 4 has locating pins 19 integrally formed to engage with locating holes 21 in the dash panel 1. The rear suspension mount bolt 8 is embedded in the locating pin 19 coaxially. With the engagement between each locating pin 19 and each locating hole 21 it is possible to complete the mutual positioning of the dash panel 1 and the reinforcement member 4, since the engagement between allows the positioning an exclusive positioning tool falls into disuse, improving the assembling workability between the panel 1 and the member 4.

12 Claims, 6 Drawing Sheets

VEHICLE BODY STRUCTURE

BACKGROUND OF THE INVENTION

1. Field Of The Invention

The present invention relates to a vehicle body structure. Particularly, it relates to the vehicle body structure around a dash panel that defines a boundary between a vehicle cabin and a front compartment of the vehicle or another boundary between the vehicle cabin and the rear compartment.

2. Description Of Related Art

In Japanese Patent Publication No. 2852653, there is disclosed a positioning and temporary-assembling structure for arrangement of pins to fasten suspension members etc. to a vehicle body member, such as a dash panel.

In the structure, a plate supporting the pins is provided with elastic clips. Fitting the respective elastic clips into recesses formed on the vehicle body member carries out the temporary supporting and positioning of the pins.

Although it is general that a plurality of pins (i.e. four pins in front, rear, left and right positions) constitute the fastening parts between the suspension member and the vehicle body member, the above-mentioned prior art structure has no function to adjust the accuracy in dimensions among the pins since each pin only supports the suspension member at a single position thereon. Thus, the above prior art structure requires an adjusting jig to ensure the accuracy in dimensions among the plural pins, causing the installation cost and the working cost to be increased with the addition of a step of setting the jig, disadvantageously.

Meanwhile and recently, some body panel members having extrusions and castings made of light metal, such as aluminum alloys, in place of conventional press moldings have carried it out to construct the vehicle body. For example, there is a vehicle body structure on development. In the structure, in order to enhance the rigidity of the dash panel defining the boundary between the vehicle cabin and the front or rear compartment, a material of light metal is extruded into a closed-sectional structure having inner and outer walls to the width direction of the vehicle. While, in order to reinforce the so-constructed dash panel, a reinforcement member made of a casting of light metal is arranged under the dash panel and joined to the dash panel.

SUMMARY OF THE INVENTION

Under the above circumstance, it is an object of the present invention to provide a vehicle body structure where a plurality of suspension mount bolts for connecting a suspension member with a reinforcement member are implanted into the reinforcement member as a casting while using an "insert" casing method, thereby abolishing a work for maintaining the accuracy of dimensions among the suspension mount bolts. Further, the object of the invention is to provide the vehicle body structure which provides the suspension mount bolts with their positioning function, so that the appropriate positioning without using any positioning jig can be completed in assembling a dash panel to the reinforcement member, thereby reducing the working cost remarkably and making the manufacturing cost advantageously.

According to the invention, the above-mentioned object is accomplished by a vehicle body structure, comprising:

a dash panel for defining a boundary between a vehicle cabin and the exterior of the vehicle cabin, the dash panel being provided by extruding a material of light metal in the width direction of the vehicle, with a closed-sectional structure having an inner wall on the side of the vehicle cabin and an outer wall on the exterior side of the vehicle cabin;

a reinforcement member positioned under the dash panel and joined to the dash panel for its reinforcement, the reinforcement member being made of a casting of light metal;

suspension mount bolts inserted into the reinforcement member being cast, the suspension mount bolts partially projecting from the reinforcement member downward; and locating pins coaxially fixed with the suspension mount bolts to project from an essential part of the reinforcement member upward.

In the body structure mentioned above, the outer wall of the dash panel has locating holes formed for engagement with the locating pins, respectively. Further, the locating pins are arranged so as to penetrate through the locating holes, thereby completing the mutual positioning between the dash panel and the reinforcement member and also engaging the dash panel with the reinforcement member.

According to the invention, the above-mentioned object is also accomplished by a vehicle body structure, comprising:

a dash panel for defining a boundary between a vehicle cabin and the exterior of the vehicle cabin, the dash panel being provided by extruding a material of light metal in the width direction of the vehicle, with a closed-sectional structure having an inner wall on the side of the vehicle cabin and an outer wall on the exterior side of the vehicle cabin;

a reinforcement member positioned under the dash panel and joined to the dash panel for its reinforcement, the reinforcement member being made of a casting of light metal; and suspension mount bolts inserted into the reinforcement member being cast, the suspension mount bolts partially projecting from the reinforcement member downward; and positioning means for positioning the dash panel and the reinforcement member mutually and engaging the dash panel with the reinforcement member.

In the present invention, there is also provided a vehicle comprising:

a dash panel for defining a boundary between a vehicle cabin and the exterior of the vehicle cabin, the dash panel being provided by extruding a material of light metal in the width direction of the vehicle, with a closed-sectional structure having an inner wall on the side of the vehicle cabin and an outer wall on the exterior side of the vehicle cabin;

a reinforcement member positioned under the dash panel and joined to the dash panel for its reinforcement, the reinforcement member being made of a casting of light metal; and suspension mount bolts inserted into the reinforcement member being cast, the suspension mount bolts partially projecting from the reinforcement member downward; and locating pins coaxially fixed with the suspension mount bolts to project from an essential part of the reinforcement member upward;

locating holes formed in the outer wall of the dash panel, for engagement with the locating pins, respectively; and separating means for separating the reinforcement member from the dash panel when each of the locating pin is subjected to a downward axial force more than a stated value.

Additionally, the present invention provides a method of assembling a vehicle body structure. That is, the vehicle body structure includes a dash panel for defining a boundary between a vehicle cabin and the exterior of the vehicle cabin, the dash panel being provided by extruding a material of light metal in the width direction of the vehicle, with a closed-sectional structure having an inner wall on the side of the vehicle cabin and an outer wall on the exterior side of the vehicle cabin; a reinforcement member positioned under the dash panel and joined to the dash panel for its reinforcement, the reinforcement member being made of a casting of light metal; suspension mount bolts inserted into the reinforcement member being cast, the suspension mount bolts partially projecting from the reinforcement member downward; locating pins coaxially fixed with the suspension mount bolts to project from an essential part of the reinforcement member upward; and locating holes formed in the outer wall of the dash panel, for engagement with the locating pins, respectively. For the vehicle body structure, the method comprises:

piling the dash panel on the reinforcement member;

allowing the locating pins to penetrate through the locating holes, thereby positioning the dash panel against the reinforcement member;

fixing the reinforcement member to the dash panel temporarily; and fixing the reinforcement member to the dash panel formally.

DESCRIPTION OF THE PREFERRED EMBODIMENT

An embodiment of the present invention will be described below, with reference to the drawings.

Figure 1:
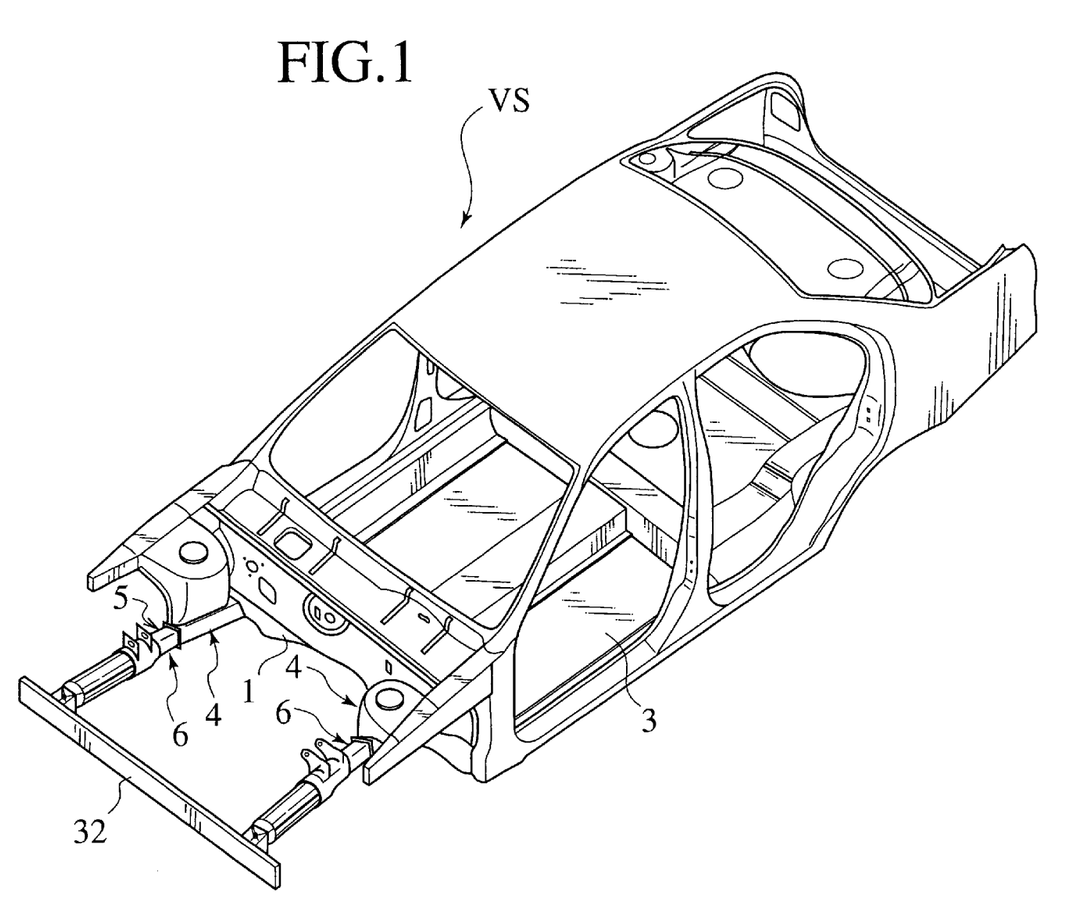
FIG. 1 is a perspective view of the overall outward appearance of a vehicle body to which the present invention is to be applied.

FIG. 1 illustrates a vehicle body VS which includes a dash panel (also known as dash cross member) 1 and a reinforcement member 4 constituting the vehicle body structure of the invention. In the shown state, the dash panel 1 is connected with the front end of a floor panel 3. On both sides of the dash panel 1 in a direction along the width of the vehicle Body VS, there are provided a pair of front side members 6 projecting in front. The leading ends of the front side members 6 are together connected with a first cross member 32 extending along the direction along the width of the vehicle Body VS. Note that this direction will be referred as "vehicle width direction" or "width-direction", hereinafter.

Figure 2:
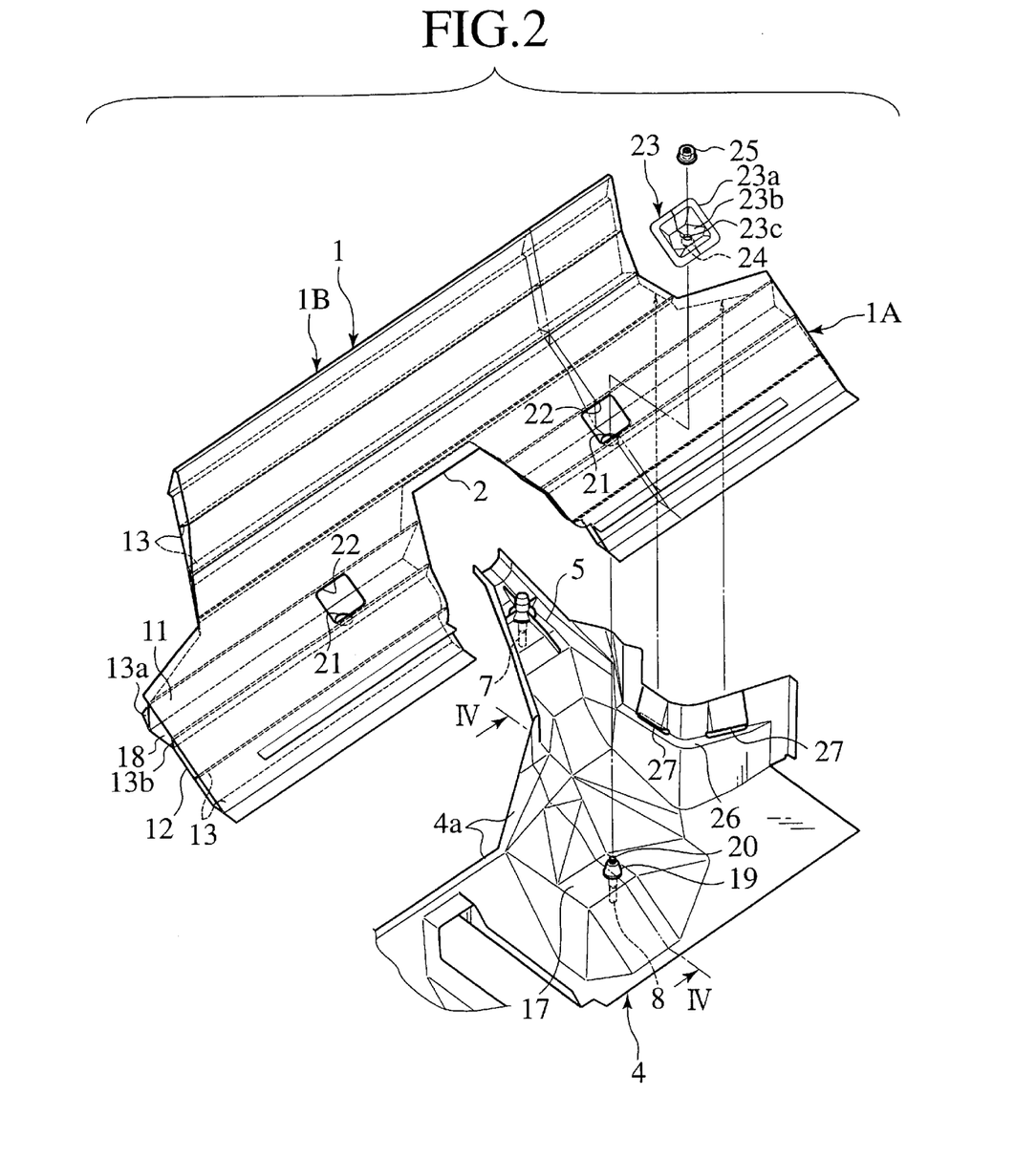
FIG. 2 is an exploded perspective view showing a dash panel and a reinforcement member in accordance with one embodiment of the invention.
Figure 3:
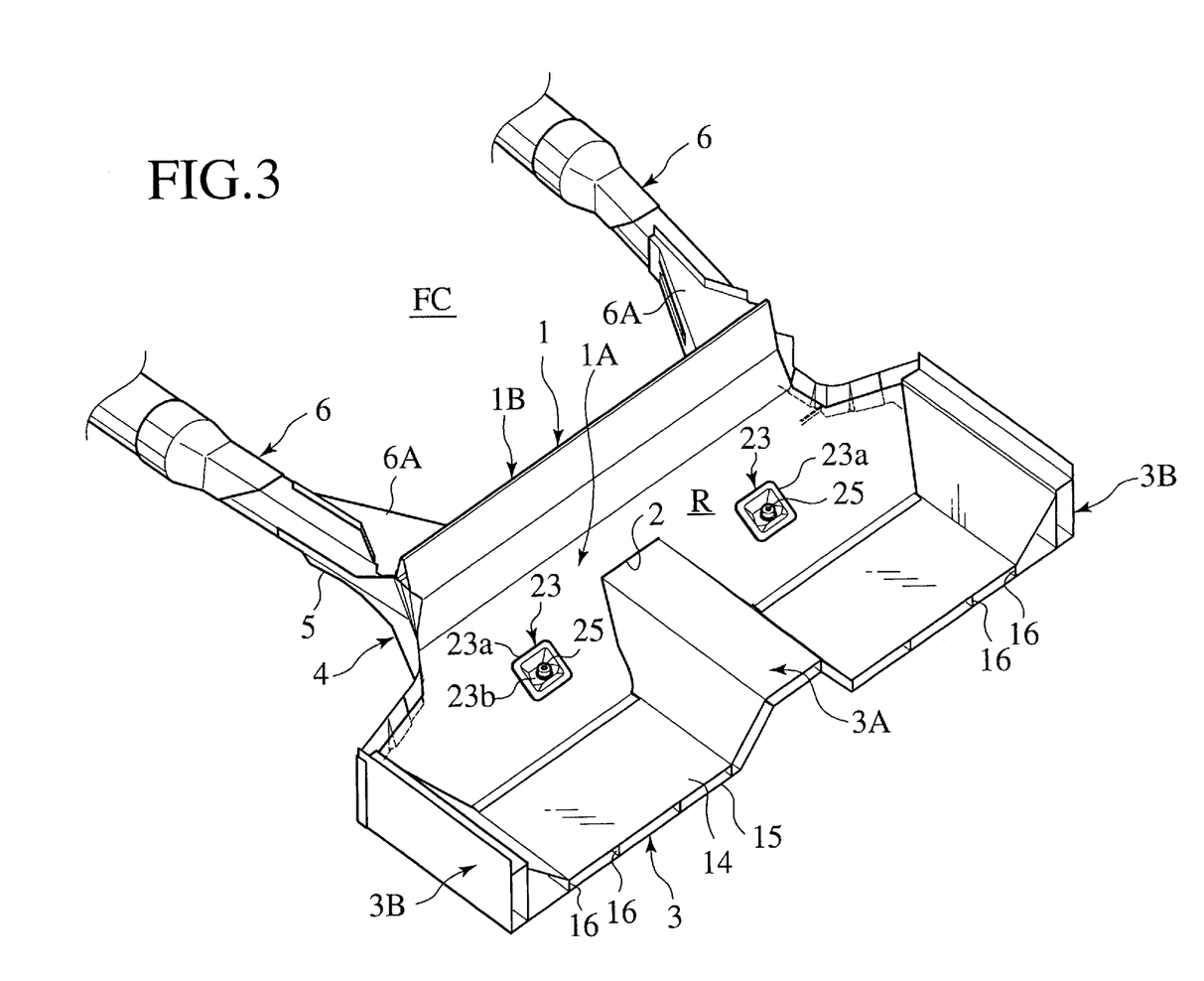
FIG. 3 is a perspective view of the dash panel and the reinforcement member of FIG. 2, showing their assembled condition.

FIGS. 2 and 3 show the dash panel 1 which defines a front compartment FC for accepting a not-shown automotive power unit (e.g. engine) in front of a vehicle cabin R. The dash panel 1 includes an inclined toe board 1A and a vertical wall part 1B rising generally perpendicularly from the toe board 1A.

The dash panel 1 has a tunnel fitting part (notch) 2 arranged at the center of the toe board 1A in the vehicle width direction, for fitting with a tunnel part 3A of the floor panel 3. On condition that the tunnel part 3A of the floor panel 3 is fitted into the notch 2 and the front end of the floor panel 3 overlaps with the rear part of the toe board 1A, the dash panel 1 is fixed to the floor panel 3 by welding.

The reinforcement member 4 is joined to the underside of the dash panel 1, extending from the toe board 1A to the vertical wall part 1B. The reinforcement member 4 is provided, on left and right sides thereof, with a pair of arm parts 5 extending forward. As shown in FIG. 3, respective rear ends of the above front side members 6 and a pair of braces 6A are together welded to the arm parts 5 of the reinforcement member 4.

According to the embodiment, the dash panel 1 can be provided by an extrusion of lightweight metallic material, such as aluminum alloy, in the vehicle width direction. By the extrusion, the dash panel 1 is formed with a closed sectional structure having an inner wall 11 and an outer wall 12. Interposed between the inner wall 11 and the outer wall 12 are a plurality of rib walls 13, which also extend to the vehicle width direction thereby enhancing the rigidity of the panel 1 itself.

In the embodiment, the floor panel 3 is also obtained by extruding the similar lightweight metallic material in a direction of both in front and in the rear of the vehicle body VB. Similarly, the floor panel 3 is provided with a closed sectional structure having an inner wall 14, an outer wall 15 and a plurality of rib walls 16. Further, side sills 3B in pairs are formed integrally with both sides of the panel 3, respectively. Note the above direction will be referred to "vehicle front/behind direction" or "front/behind-direction", hereinafter.

In production, lightweight metal is cast into the reinforcement member 4. The "as cast" reinforcement member 4 includes suspension mount bolts 7, 8 inserted into a member body. The suspension mount bolts 7 are embedded in left and right arm parts 5 projecting on both sides of the member 4 integrally. On the other hand, the suspension mount bolts 8 are embedded in a rear section of the member 4 in the vehicle front/behind direction, on both sides of the member 4. These suspension mount bolts 7, 8 are inserted and secured in the member 4 so as to partially project from the member 4 downward. In FIG. 2, the suspension mount bolts 7, 8 in pairs are shown on one side of the reinforcement member 4.

Figure 4:
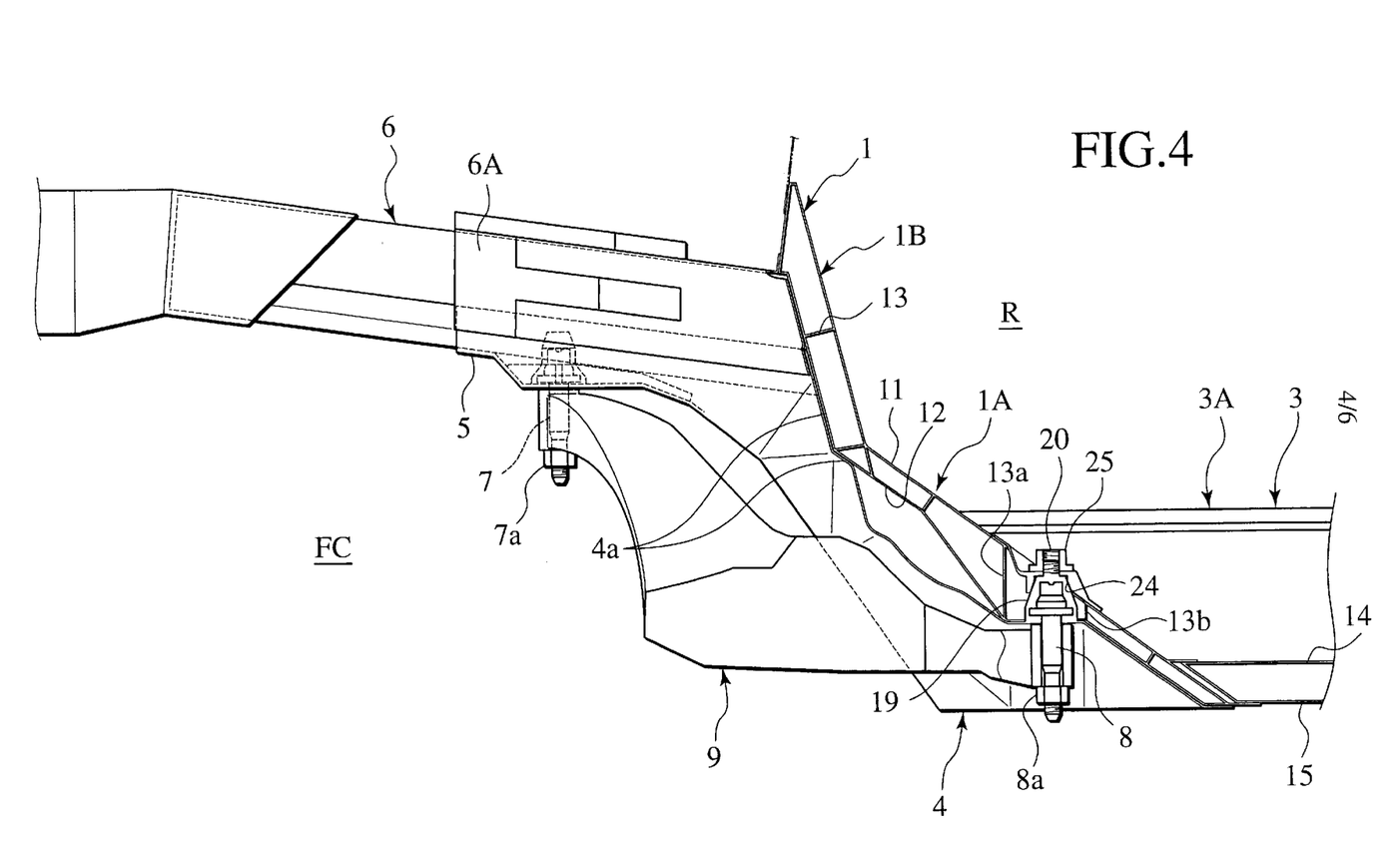
FIG. 4 is a sectional view of the dash panel and the reinforcement member in the assembled condition, taken along a line IV—IV of FIG. 2.
Figure 5:
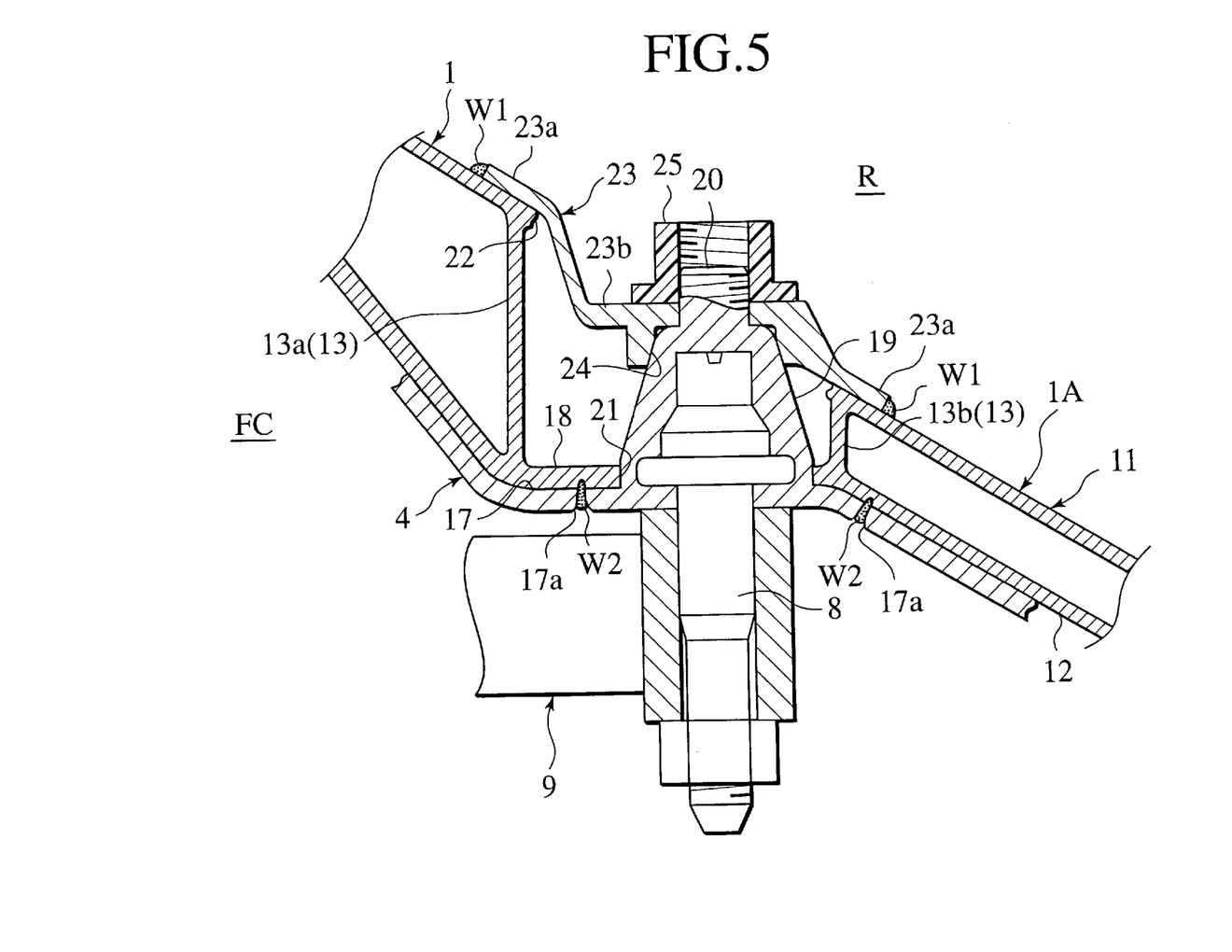
FIG. 5 is an enlarged view showing the vicinity of a locating pin in FIG. 4.

As shown in FIG. 4, left and right suspension members 9 in pairs (only one shown) are arranged underside the reinforcement member 4 astride. Each suspension member 9 is fastened, on both longitudinal sides thereof, to the pair of suspension bolts 7, 8 through suspension mount nuts 7a, 8a, respectively. Carried by these suspension members 9 are automotive front suspension units which are not shown in the figure.

Basically, by piling the toe board 1A of the dash panel 1 on a front flange 4a of the reinforcement member 4 between the left and right arm parts 5 and subsequently welding the toe board 1A to the front flange 4a, the reinforcement member 4 is connected with the dash panel 1. Nevertheless, the reinforcement member 4 is further fastened to the dash panel 1 at respective implanting positions for the rear suspension mount bolts 8, 8, which will be described later, in detail.

Horizontal bearing surfaces 17 having appropriate area are respectively ensured on the upper face of the reinforcement member 4 at respective positions where the "insert" suspension mount bolts 8 are embedded into the member 4. While, a substantially horizontal and belt-shaped flat face 18 is formed on the outer wall of the toe board 1A so as to extend in the width-direction of the vehicle, correspond to the bearing surfaces 17 of the member 4.

The reinforcement member 4 further includes locating pins 19 integrally formed so as to project from the bearing surfaces 17 in coaxial with the suspension bolts 8, while the dash panel 1 is provided, on the toe board 1A, with locating holes 21 for engagement with the locating pins 19, allowing the dash panel 1 and the reinforcement member 4 to be positioned each other.

According to the embodiment, the contour of each locating pin 19 is tapered to have its upper part of smaller diameter and also provided, on an upper end thereof, with a thread part 20 which projects from an inner wall of the toe board 1A upward.

The locating holes 21 are formed in the flat face 18 on the outer wall 12 of the toe board 1A, while the inner wall 11 has, for example, rectangular openings 22 formed above the locating holes 21 in the outer wall 12, respectively.

A retainer plate 23 in the form of a lid closes each opening 22. By making the thread part 20 of each locating pin 19 penetrate through the retainer plate 23 and subsequently fastening a nut 25 onto the thread part 20 for fixture, the reinforcement member 4 is temporarily carried by the dash panel 1.

The retainer plate 23 is rectangular so as to accord with the configuration of the opening 22 and also provided, at the central part surrounded by a marginal flange 23a, with a substantially-horizontal bearing part 23b. The marginal flange 23a of the plate 23 is joined to the periphery of the opening 22 through a continuous weld $W_1$, allowing the thread part 20 to pass through an attachment hole 23c formed in the bearing part 23b.

On the underside of the bearing part 23b, a tapered fitting recess 24 is formed for engagement with the upper end of each locating pin 19.

In a plurality of ribs between the inner wall 11 with the outer wall 12 of the dash panel 1, a front rib 13a and a rear rib 13b both close to the locating pins 19 are positioned within the vertically-projected area of each retainer plate 23, in detail, underside of the marginal flange 23a of the plate 23.

Being made of resinous material or the like, each nut 25 in mesh with the threaded part 20 of the locating pin 19 is established so as to have a strength allowing the nut 25 to be broken by a downward axial force more than a stated value, which would be applied on the locating pin 19 at the vehicle's collision on its front side, so that the locating pin 19 can be separated from the toe board 1A by the input of the downward axial force.

Furthermore, in the vicinities of the respective locating pins 19, there are provided welds $W_2$ which join the bearing surfaces 17 of the reinforcement member 4 to the flat face 18 on the outer wall 12 of the toe board 1A and which are separable from the outer wall 12 by the downward axial force more than the above stated value.

The welds $W_2$ can be provided by one-directionally welding the bearing surfaces 17 to the toe board 1A through respective V-shaped grooves 17a formed on the opposite side of the bearing surfaces 17 of the reinforcement member 4. For example, each V-shaped groove 17a has a depth generally equal to one half of the plate thickness of the bearing surface 17 and an opened angle more than 30 degrees.

As mentioned above, the left and right locating pins 19 of the embodiment are engaged with the locating holes 21 on both sides of the dash panel 1 and the nuts 25 are fastened to the thread parts 20, thereby accomplishing the positioning and temporary fixing between the dash panel 1 and the reinforcement panel 4. Besides these elements, as shown in FIG. 2, the reinforcement member 4 is provided, on both sides thereof in the vehicle-width direction, with positioning shelves 26 which are engageable with both ends (in the vehicle-width direction) of the dash panel 1 being dropped from the upside to the member 4 and clip parts 27 which are formed in the shelves 26 so as to fit to both edges of the outer wall 12 of the dash panel 1 being dropped from the upside to the member 4. Owing to the provision of the positioning shelves 26 and the clip parts 27, the positioning and temporary fixing between the dash panel 1 and the reinforcement panel 4 can be accomplished more certainly.

In this way, according to the structure of the above-mentioned embodiment, the suspension mount bolts 7, 8 as "inserts" are integrated with the reinforcement member 4 as a casting of lightweight metal and furthermore, all the suspension mount bolts 7, 8 for connecting the suspension members 9 to the under face of the reinforcement member 4 are gathered up together through the reinforcement member 4. Therefore, since the respective distances between the suspension mount bolts 7, 7; and 8, 8 can be respectively fixed in one component, i.e. the reinforcement member 4, it is possible for a worker to do without the conventional work for ensuring the accuracy of distances between the suspension mount bolts 7, 8 while using the positioning tool.

Additionally, owing to the provision of the locating pins 19 in coaxial with the rear suspension mount bolts 7 on left and right and the insertion and fixing of the pins 19 into the locating holes 21 in the toe board 1A of the dash panel 1, it is possible to position the dash panel 1 and the reinforcement member 4 with accuracy and also ensure the precise positioning of the bolts 8 against the dash panel 1, simultaneously. Thus, the suspension members 9 can be secured in appropriate positions on the dash panel 1.

The above-mentioned arrangement does not quite require the positioning tools for arrangement of the suspension mount bolts 7, 8, the same for assembling the dash panel 1 to the reinforcement member 4, the process of setting the tools and the positioning work, thereby accomplishing the remarkable reduction in cost of the body structure.

Further, according to the embodiment, since each locating pin 19 is provided with the thread part 20 which allows the dash panel 1 to be held on the reinforcement member 4 temporarily owing to the screw engagement of the nut 25 with the thread part 20 interposing the retainer plate 23, such the engagement form makes the conventional exclusive clamping tool for holding the dash panel 1 and the reinforcement member 4 unnecessary, thereby progressing the reduction in cost of the body structure.

On the other hand, the suspension mount bolts 8 are secured on the outer wall 12 and the inner wall 11 of the toe board 1A through the coaxial locating pins 19 in a predetermined span. In other words, the suspension mount bolts 8 are respectively supported by both of the outer wall 12 and the inner wall 11 of the toe board 1A. Accordingly, the structure's rigidity to support the bolts 8 and the rigidity against the bending moment are together enhanced thereby to improve the rigidity to support the suspension members 9.

Particularly in the embodiment, owing to the provision of the rib walls 13a, 13b arranged close ahead and behind each locating pin 19 within the vertically-projected plane of the retainer plate 23 to connect the outer wall 12 to the inner wall 11, the surface buckling of the inner and outer walls 11, 12 can be restricted by the rib walls 13a, 13b, in case of screwing and fastening the nut 25 onto the thread part 20 of the locating pin 19 through the retainer plate 23. Accordingly, also from this point of view, the structure's rigidity to support the bolts 8, i.e. the rigidity to support the. suspension members 9 can be further enhanced with the prevention of the nuts 25 from being loosen.

Figure 6:
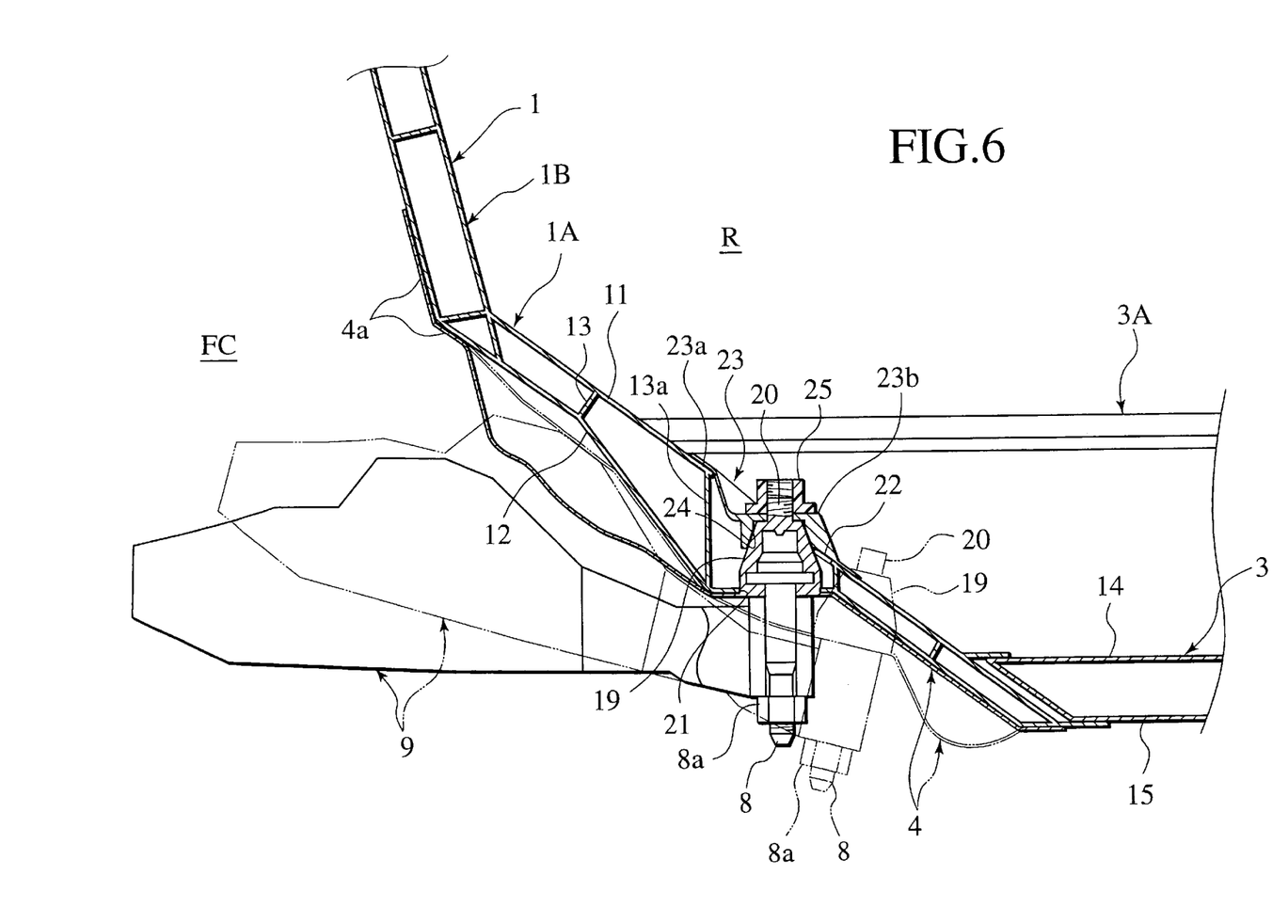
FIG. 6 is a sectional view for explanation of the separating action of the locating pin, similar to FIG. 4.

Since the tapered upper end of each locating pin 19 is fitted into the fitting recess formed on the under face of the retainer plate 23, the engagement area of the locating pin 19 with the inner wall 11 of the dash panel 1 can be enlarged consequently. Furthermore, according to this arrangement, it is possible to receive the suspension input, which has been transmitted from the suspension member 9 to the locating pin 19 via the suspension mount bolt 8 during the vehicle's traveling, by the above tapered fitting part of the locating pin 19 in not only the axial direction but the radial direction thereby to certainly distribute the so-transmitted suspension input to the "high-rigidity" dash panel 1 via the retainer plate 23. Accordingly, it is possible to enhance the supporting rigidity of each suspension mount bolt 8 furthermore, According to the embodiment, the nuts 25 for screw engagement with the thread parts 20 are respectively established so as to each have a strength allowing the nut 25 to be broken by the downward axial force (more than a stated value) inputted into the locating pin 19 thereby causing the locating pin 19 to be separated from the toe board 1A. Therefore, at the vehicle's collision at its front side, the separation of the locating pins 19 from the toe board 1A allows the rear side of the reinforcement member 4 to move back obliquely downward along the inclination of the toe board 1A, thereby surely backing the suspension members 9 into the downside of the vehicle cabin R, as shown in FIG. 6. As a result, there is no possibility that the suspension members 9 of high rigidity act as stretching members against the buckling deformation of the front compartment FC in the vehicle's forth/back direction, whereby the buckling stroke of the front compartment FC in the same direction can be increased thereby to enlarge the absorption of collision energy.

Especially, the above-mentioned control in strength of the nuts 25 allows the locating pins 19 to move apart from the toe board 1A by the input, i.e. an external force at the vehicle's collision, without being accompanied with a large-scale mechanism or exclusive components.

Therefore, the vehicle body structure of the embodiment is advantageous in view of manufacturing cost.

Additionally, in the vicinities of the locating pins 19, there are provided the welds $W_2$ each of which serves to connect the reinforcement member 4 to the outer wall 12 of the toe board 1A with a welding strength which allows the reinforcement member 4 to be separated from the toe board 1A by the downward axial force more than the stated value, which might be applied on the locating pin 19 at the vehicle's collision on its front side. Therefore, it is possible to enhance the bonding rigidity of the locating pin 19, in other words, the supporting rigidity of each the suspension mount bolt 8 without exerting an influence on the separable function of the locating pin 19 at the vehicle's collision on its front side.

Moreover, since the welds $W_2$ are brought by the formation of the V-shaped grooves 17a on the under face of the reinforcement member 4 and the one-directional welding of the reinforcement member 4 to the toe board 1A through the V-shaped grooves 17a, such the welding structure allows the separating strength Joint strength) of the member 4 to be adjusted with ease and the welding operation to be easily completed as well.

Although the invention has been described above by reference to one embodiment of the invention, the invention is not limited to the embodiment described above. Modifications and variations of the embodiment described above will occur to those skilled in the art, in light of the above teachings.

For example, although the above-mentioned embodiment takes example by the application of the present vehicle body structure on the front compartment FC of the vehicle, the present structure is also applicable to the vicinity of a not-shown rear compartment. Thus, it should be noted that the dash panel in this specification might include a partition wall separating the rear compartment from the vehicle cabin. In this modified case, it is preferable to construct the nuts 25 to be engaged with the thread parts 20 of the locating pins, by high-strength material.

In such a case, the locating pins 19 could be firmly fixed on the dash panel 1 by the "high-strength" nuts 25. Accordingly, even if the downward axial force is applied on the locating pin 19 via the suspension mount bolts 8 at the vehicle's collision, then it is possible to prevent the locating pins 19 from being separated from the dash panel 1 thereby protecting various components installed in the rear compartment.

The entire contents of Japanese Patent Application No. 11-254748 (filed Sep. 8, 1999) is incorporated herein by reference. The scope of the invention is defined with reference to the following claims.

What is claimed is:

1. A vehicle body structure, comprising:
    a dash panel for defining a boundary between a vehicle cabin and the exterior of the vehicle cabin, the dash panel being provided by extruding a material of light metal in the width direction of the vehicle, with a closed-sectional structure having an inner wall on the side of the vehicle cabin and an outer wall on the exterior side of the vehicle cabin;
    a reinforcement member positioned under the dash panel and joined to the dash panel for its reinforcement, the reinforcement member being made of a casting of light metal; and
    a suspension mount bolt inserted into the reinforcement member being cast, the suspension mount bolt partially projecting from the reinforcement member downward; and
    a locating pin coaxially fixed with the suspension mount bolt to project from an essential part of the reinforcement member upward; wherein
    the outer wall of the dash panel has a locating hole formed for engagement with the locating pin; and
    the locating pin is arranged to penetrate through the locating hole, thereby completing the mutual positioning between the dash panel and the reinforcement member and also engaging the dash panel with the reinforcement member.

2. The vehicle body structure of claim 1, wherein the locating pin is provided with a tip having a thread part which projects from the outer wall of the dash panel upward under condition that the locating pin is inserted into the locating hole;

the vehicle body structure further comprises:

retainer plate arranged on the inner wall of the dash panel, the retainer plate having a hole formed for allowing the thread part of the locating pin to pass through; and nut arranged on the retainer plate, for screw engagement with the thread part of the locating pin projecting from the retainer plate upward; and wherein, in arrangement, the locating pin is laid across the outer wall and the inner wall of the dash panel and the thread part of the locating pin is fastened on the retainer plate by the nut, whereby an external force transmitted on the dash panel through the locating pin can be dispersed by the retainer plate.

3. The vehicle body structure of claim 2, wherein the dash panel is provided, in the closed-sectional structure, with a rib wall which connect the outer wall with the inner wall in the front and rear vicinities of the locating pin, within a vertical projected plane of the retainer plate.

4. The vehicle body structure of claim 2, wherein the locating pin is tapered to have a smaller diameter on an upper end thereof;

the inner wall of the dash panel has opening formed above the locating hole formed in the outer wall, respectively;

the retainer plate is shaped in the form of a lid which closes up the opening in the inner wall and is also provided with a tapered fitting recess which fits on the upper end of the locating pin.

5. The vehicle body structure of claim 2, wherein the dash panel is identical to a front dash panel that defines a boundary between the vehicle cabin and a front compartment of the vehicle;

the suspension bolts are respectively arranged at front left, front right, rear left and rear right positions on the reinforcement member connected on the underside of the dash panel.

6. The vehicle body structure of claim 5, wherein the nut is in mesh with the thread part of the locating pin is established to have a strength allowing the nut to be broken by a downward axial force applied on the locating pin, the downward axial force being more than a stated value, whereby the reinforcement member can be separated from the dash panel owing to the breaking of the nut by the downward axial force.

7. The vehicle body structure of claim 5, wherein the reinforcement member is provided, in the vicinities of the locating pin, with welds which join the essential part of the reinforcement member to the outer wall of the dash panel and which is separable from the outer wall by a downward axial force applied on the locating pin, the downward axial force being more than a stated value.

8. The vehicle body structure of claim 7, wherein p1 the reinforcement member has a plurality of V-shaped grooves each formed on an under face thereof with a designated depth and a designated open angle; and the welds are provided by welding the dash panel and the reinforcement member together at the V-shaped grooves, in one direction from the side of the under face of the reinforcement member.

9. The vehicle body structure of claim 2, wherein the dash panel is identical to a rear dash panel that defines a boundary between the vehicle cabin and a rear compartment of the vehicle;

the nut for screw engagement with the thread part of the locating pin are made of high-strength material.

10. A vehicle body structure, comprising:

a dash panel for defining a boundary between a vehicle cabin and the exterior of the vehicle cabin, the dash panel being provided by extruding a material of light metal in the width direction of the vehicle, with a closed-sectional structure having an inner wall on the side of the vehicle cabin and an outer wall on the exterior side of the vehicle cabin;

a reinforcement member positioned under the dash panel and joined to the dash panel for its reinforcement, the reinforcement member being made of a casting of light metal; and a suspension mount bolt inserted into the reinforcement member being cast, the suspension mount bolt projecting from the reinforcement member downward; and positioning means for positioning the dash panel and the reinforcement member mutually and engaging the dash panel with the reinforcement member.

11. The vehicle body structure of claim 10, further comprising dispersing means for dispersing an external force transmitted on the dash panel through the positioning means.

12. A vehicle comprising:

a dash panel for defining a boundary between a vehicle cabin and the exterior of the vehicle cabin, the dash panel being provided by extruding a material of light metal in the width direction of the vehicle, with a closed-sectional structure having an inner wall on the side of the vehicle cabin and an outer wall on the exterior side of the vehicle cabin;

a reinforcement member positioned under the dash panel and joined to the dash panel for its reinforcement, the reinforcement member being made of a casting of light metal; and a suspension mount bolt inserted into the reinforcement member being cast, the suspension mount bolt partially projecting from the reinforcement member downward; and a locating pin coaxially fixed with the suspension mount bolt to project from an essential part of the reinforcement member upward;

a locating hole formed in the outer wall of the dash panel, for engagement with the locating pin; and separating means for separating the reinforcement member from the dash panel when the locating pin is subjected to a downward axial force more than a stated value.

* * * * *